US009581176B2

(12) United States Patent
Izumi et al.

(10) Patent No.: US 9,581,176 B2
(45) Date of Patent: Feb. 28, 2017

(54) CONSTRUCTION MACHINE HAVING REVOLVING STRUCTURE

(75) Inventors: Shiho Izumi, Hitachinaka (JP);
Manabu Edamura, Kasumigaura (JP);
Kouichi Shibata, Kasumigaura (JP);
Manabu Sugiura, Tsuchiura (JP);
Takatoshi Ooki, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 425 days.

(21) Appl. No.: 13/979,436

(22) PCT Filed: Jan. 19, 2012

(86) PCT No.: PCT/JP2012/051093
§ 371 (c)(1),
(2), (4) Date: Jul. 12, 2013

(87) PCT Pub. No.: WO2012/099208
PCT Pub. Date: Jul. 26, 2012

(65) Prior Publication Data
US 2013/0298544 A1 Nov. 14, 2013

(30) Foreign Application Priority Data
Jan. 21, 2011 (JP) ................. 2011-011096

(51) Int. Cl.
*F15B 15/18* (2006.01)
*B60T 8/00* (2006.01)
(Continued)

(52) U.S. Cl.
CPC ............... *F15B 15/18* (2013.01); *B60K 6/28* (2013.01); *B60K 6/485* (2013.01); *E02F 9/123* (2013.01);
(Continued)

(58) Field of Classification Search
CPC .... F15B 21/14; E02F 9/20; E02F 9/22; B60L 1/20; B60L 1/00; B60K 6/12; B60Q 1/50
(Continued)

(56) References Cited

U.S. PATENT DOCUMENTS 6,555,928 B1 * 4/2003 Mizuno ............... B60L 11/1887
180/65.51
6,700,213 B1 * 3/2004 Wakashiro ............. B60K 6/485
180/65.1
(Continued)

FOREIGN PATENT DOCUMENTS

| JP | 10-103112 | 4/1998 |
|----|-----------|--------|
| JP | 2008-63888 | 3/2008 |
| JP | 2010-242444 | 10/2010 |

OTHER PUBLICATIONS

Ochiai, Takashi (Hydraulic Driving Gear, Machine Translation of the description of JP 10103112 A, as translated by Google Translate. [retrieved on Sep. 28, 2015 from URL <http://patentscope.wipo.int>]).*

*Primary Examiner* — F. Daniel Lopez
*Assistant Examiner* — Richard Drake
(74) *Attorney, Agent, or Firm* — Baker Botts L.L.P.

(57) ABSTRACT

Both a hydraulic motor and an electric motor are provided for driving an upper swing structure. When the amount of electricity stored in a capacitor is appropriate, the upper swing structure is driven by both the hydraulic motor and the electric motor. When the amount of electricity stored in the capacitor exceeds an appropriate value, the mode is changed over to a mode in which the upper swing structure is driven only by the hydraulic motor, and an assist electric generation motor is assist-driven or engine-driven to thereby rapidly return the amount of electricity stored in the capacitor to an appropriate range. The capacity of the capacitor can be reduced, and the amount of electricity stored in the capacitor (Continued)

can be managed without losing the operability of swing motion.

6 Claims, 10 Drawing Sheets

(51) Int. Cl.
  *B60L 1/00* (2006.01)
  *E02F 9/12* (2006.01)
  *E02F 9/20* (2006.01)
  *B60K 6/28* (2007.10)
  *B60K 6/485* (2007.10)
(52) U.S. Cl.
  CPC .......... *E02F 9/2091* (2013.01); *E02F 9/2095* (2013.01); *B60Y 2400/114* (2013.01); *Y02T 10/6226* (2013.01)
(58) Field of Classification Search
  USPC .................. 60/414, 431; 37/348; 290/40 C
  See application file for complete search history.

(56) References Cited

U.S. PATENT DOCUMENTS

| | | | | |
|---|---|---|---|---|
| 6,851,207 | B2* | 2/2005 | Yoshimatsu | E02F 9/2075 37/348 |
| 7,086,226 | B2* | 8/2006 | Oguri | E02F 9/2075 60/414 |
| 7,487,023 | B2* | 2/2009 | Komiyama | B60Q 1/50 318/98 |
| 8,812,202 | B2* | 8/2014 | Yamamoto | E02F 9/123 303/112 |
| 8,831,805 | B2* | 9/2014 | Izumi | B60L 1/20 701/22 |
| 2002/0125052 | A1* | 9/2002 | Naruse | B60K 6/12 180/53.8 |
| 2006/0097575 | A1* | 5/2006 | Xu | B60L 11/005 307/9.1 |
| 2008/0317574 | A1* | 12/2008 | Moriya | E02F 9/128 414/687 |
| 2011/0001370 | A1* | 1/2011 | Yamada | F03C 1/0607 310/54 |

* cited by examiner

LEVER OPERATION AMOUNT

SWING TORQUE — Tms1+Tadd, Tmo+Tms1+Tadd, Tmo, Tms1

STATE OF ELECTRICITY STORED IN CAPACITOR

CONSTRUCTION MACHINE HAVING REVOLVING STRUCTURE

TECHNICAL FIELD

The present invention relates to a construction machine having a swing structure such as a hydraulic excavator. Particularly, it relates to an energy management unit in a construction machine provided with an electric motor for driving a swing structure, an electric motor for assisting a hydraulic pump, and an electric storage device for storing electric energy regenerated from those electric motors and releasing electric energy to those electric motors.

BACKGROUND ART

In the background art, construction machines having swing structures such as hydraulic excavators, in each of which a hydraulic pump is driven by an engine and a hydraulic motor is rotated by hydraulic pressure ejected from the hydraulic pump so as to drive the swing structure which is an inertia body, constitute the mainstream. In recent years, however, a hybrid type construction machine in which a swing structure is driven by use of both an electric motor driven by electric energy supplied from an electric storage device and a hydraulic motor has been proposed in order to improve the fuel consumption of an engine, reduce the noise level and reduce the amount of exhaust gas, and so on (for example, see Patent Document 1). In addition to the electric motor used for revolution, another electric motor which is used for generating electric power and which supplies electric energy to the electric storage device when the level of electricity stored in the electric storage device is low is also provided in the construction machine according to Patent Document 1.

In such a hybrid type construction machine, driving torque undertaken by the hydraulic motor and the electric motor is required to be controlled appropriately so that an operator accustomed to operating a background-art construction machine for driving a swing structure by use of only a hydraulic motor can operate without feeling anything wrong. On that occasion, electric energy consumed during driving (motor driving) and generated during braking (regeneration) by the electric motor is stored and released by the electric storage device connected to the electric motor. Since there is a limit in the capacity of the electric storage device, it is particularly important to properly manage the amount of electricity stored in the electric storage device, that is, to perform energy management.

In Patent Document 1, disclosed is a technique in which a torque instruction unit by which an instruction of toque with which the electric motor is driven and controlled is given in connection to a differential pressure between the inlet and the outlet of the hydraulic motor used for swing drive is provided as a control unit for the hybrid type construction machine. In addition, also in Patent Document 1, disclosed is a technique in which the ratio between the torque of the hydraulic motor and the torque of the electric motor during acceleration drive and the ratio between the torque of the hydraulic motor and the torque of the electric motor during deceleration drive are defined using the differential pressure between the inlet and the outlet of the hydraulic motor as a parameter (for example, paragraph 0060). In Patent Document 1, description is made that according to these techniques, the swing structure which is an inertia body can be driven and controlled continuously and smoothly and the energy during braking can be imported as electric energy into the electric storage device effectively (for example, paragraphs 0033 and 0034).

CITATION LIST

Patent Literature

Patent Literature 1: JP-A-2008-63888

SUMMARY OF INVENTION

Technical Problem

The technique described in Patent Document 1 has a configuration in which the torque undertaken by the hydraulic motor and the torque undertaken by the electric motor during acceleration drive and during deceleration drive are changed respectively using the differential pressure between the inlet and the outlet of the hydraulic motor as a parameter so as to change the ratio therebetween and acquire torque required for driving the swing structure. According to the configuration, the amount of electricity stored in the electric storage device increases/decreases due to a difference between the electric energy consumed by the electric motor during the acceleration drive and the electric energy generated by the electric motor during the deceleration drive. It is a matter of course that the electric motor cannot be driven with required torque if the amount of electricity stored in the electric storage device runs short. On the contrary, if the amount of electricity stored in the electric storage device becomes an overcharged state, the life of the electric storage device may be adversely affected. In the worst case, the electric storage device may be damaged.

As for management for the charge/discharge of the electric storage device, description is merely made in Patent Document 1 that the electric motor for generating electric power is driven and the generated electric energy is supplied to the electric storage device when the amount of electricity stored in the electric storage device is smaller than a predetermined value (paragraphs 0053 and 0055), but no description about strict energy management also including the charge/discharge of the electric storage device is given in Patent Document 1. Incidentally, if a large-capacity electric storage device is provided, strict energy management can be dispensed with. However, there is a demerit that as the capacity of the electric storage device increases, the space where the electric storage device is installed in the construction machine increases and the cost of the construction machine increases.

Further, even if strict energy management is carried out, the amount of electricity stored in the electric storage device may exceed an appropriate value due to a difference between the electric energy consumed by the electric motor during acceleration drive and the electric energy generated by the electric motor during deceleration drive because the work pattern of the machine is not defined. In order to prevent this, the increase of the capacity of the electric storage device can be considered but is undesirable in view of the installation space or the cost, as described above. In order to put the hybrid type construction machine into practical use, work is required to be able to be kept on even if the amount of electricity stored in the electric storage device exceeds the appropriate value.

The invention has been accomplished in order to solve such problems inherent in the background art. An object of the invention is to provide a hybrid type construction machine in which work may be kept on if the amount of electricity stored in an electric storage device is the minimum, and work can be also kept on even if the amount of the stored electricity is out of an appropriate value.

Solution to Problem

In order to achieve the foregoing object, the invention is configured as a construction machine having a swing structure, including: an engine; a hydraulic pump which is driven by the engine; the swing structure; a first electric motor and a hydraulic motor which drive the swing structure; a swing operation lever which is operated by an operator to drive the swing structure; a second electric motor which assist-drives the hydraulic pump during motoring and generates electric energy during drive using the engine; an electric storage device which stores electric energy to be supplied to the first and second electric motors; and a controller which receives a signal corresponding to an operation amount and an operation direction on the swing operation lever and controls charge and discharge in the electric storage device, wherein: the controller stores, for an amount of electricity stored in the electric storage device, an upper limit value and a lower limit value of a normal use region which is an optimal use range of the electric storage device, a regeneration prohibition value which is set to be larger than the upper limit value of the normal use region and to be smaller than a maximum amount of electricity stored in the electric storage device, and a swing prohibition value which is set to be smaller than the lower limit value of the normal use region and to be larger than a minimum amount of electricity stored in the electric storage device; and when the amount of electricity stored in the electric storage device is in the normal use range, the controller drives and brakes the swing structure in accordance with an operation amount and an operation direction on the swing operation lever using both the first electric motor and the hydraulic motor; when the amount of electricity stored in the electric storage device exceeds the upper limit value of the normal use range and reaches the regeneration prohibition value, the controller drives and brakes the swing structure in accordance with the operation amount and the operation direction on the swing operation lever using only the hydraulic motor while motoring the second electric motor so as to consume the electric energy stored in the electric storage device; and conversely when the amount of electricity stored in the electric storage device falls below the lower limit value of the normal use range and reaches the swing prohibition value, the controller drives and brakes the swing structure in accordance with the operation amount and the operation direction on the swing operation lever using only the hydraulic motor while using the engine to drive the second electric motor so as to charge the electric storage device.

As described above, even if strict energy management is carried out in a hybrid type construction machine, the amount of electricity stored in the electric storage device may exceed an appropriate value due to a difference between the electric energy consumed by the first electric motor during acceleration drive and the electric energy generated by the first electric motor during deceleration drive. In the hybrid type construction machine configured as described above, the system is changed over to a system in which the swing structure is driven and braked using only the hydraulic motor, when the amount of electricity stored in the electric storage device reaches the regeneration prohibition value or the swing prohibition value set in advance. It is therefore possible to continue to swing the swing structure, that is, to do work using the construction machine. At the same time, in the hybrid type construction machine configured as described above, the second electric motor is motored or engine-driven to accelerate charging/discharging the electric storage device so that the mode to drive the swing structure can be quickly resumed to a normal mode using both the first electric motor and the hydraulic motor.

In addition, the invention is configured as a construction machine having the aforementioned configuration so that when the amount of electricity stored in the electric storage device exceeds the upper limit value of the normal use range and reaches the regeneration prohibition value, the controller continues to drive and brake the swing structure using only the hydraulic motor till the amount of electricity stored in the electric storage device reaches a predetermined intermediate value set between the upper limit value and the lower limit value of the normal use range, and as soon as the amount of electricity stored in the electric storage device reaches the intermediate value, the controller changes over to drive and brake the swing structure using both the first electric motor and the hydraulic motor.

With this configuration, the difference between the regeneration prohibition value and the intermediate value can be increased. Thus, it becomes difficult for the amount of electricity stored in the electric storage device to exceed the upper limit value of the normal use range and reach the regeneration prohibition value. It is therefore possible to reduce the frequency with which the state is changed over from a driving/braking state of the swing structure using both the first electro motor and the hydraulic motor to a driving/braking state of the swing structure using only the hydraulic motor.

In addition, the invention is configured as a construction machine having the aforementioned configuration so that when the amount of electricity stored in the electric storage device falls below the lower limit value of the normal use range and reaches the swing prohibition value, the controller continues to drive and brake the swing structure using only the hydraulic motor till the amount of electricity stored in the electric storage device reaches a predetermined intermediate value set between the upper limit value and the lower limit value of the normal use range, and as soon as the amount of electricity stored in the electric storage device reaches the intermediate value, the controller changes over to drive and brake the swing structure using both the first electric motor and the hydraulic motor.

With this configuration, the difference between the swing prohibition value and the intermediate value can be increased. Thus, it becomes difficult for the amount of electricity stored in the electric storage device to fall below the lower limit value of the normal use range and reach the swing prohibition value. It is therefore possible to reduce the frequency with which the state is changed over from a driving/braking condition of the swing structure using both the first electro motor and the hydraulic motor to a driving/braking state of the swing structure using only the hydraulic motor.

In addition, the invention is configured as a construction machine having the aforementioned configuration so that when the amount of electricity stored in the electric storage device is within the normal use range and the controller is driving the swing structure in accordance with the operation amount and the operation direction on the swing operation lever using both the first electric motor and the hydraulic motor, the controller computes a driving torque instruction value for the first electric motor in accordance with the amount of electricity stored in the electric storage device and the first electric motor is driven based on the computed driving torque instruction value.

The torque and the electric generation amount of the first electric motor provided for swing the swing structure are much larger than those of the second electric motor provided for charging and discharging the electric storage device. Accordingly, when a driving torque instruction value for the first electric motor is computed in accordance with the amount of electricity stored in the electric storage device and the first electric motor is driven based on the computed driving torque instruction value, the electric storage device can be charged and discharged more efficiently than when the second electric motor is used. It is therefore possible to reduce the frequency with which the state is changed over to a driving/braking state of the swing structure using only the hydraulic motor while it is possible to reduce the capacity of the electric storage device. In addition, the energy can be used so effectively that the fuel consumption can be improved.

In addition, the invention is configured as a construction machine having the aforementioned configuration so that when the amount of electricity stored in the electric storage device is within the normal use range and the controller is braking the swing structure in accordance with the operation amount and the operation direction on the swing operation lever using both the first electric motor and the hydraulic motor, the controller computes a driving torque instruction value for the first electric motor in accordance with the amount of electricity stored in the electric storage device and the first electric motor is driven based on the computed driving torque instruction value so as to brake the swing structure.

Also in this case, it is possible to obtain the same effect as that when the first electric motor is driven using the computed additional value.

In addition, the invention is configured as a construction machine having the aforementioned configuration so that the driving torque instruction value for the first electric motor computed in accordance with the amount of electricity stored in the electric storage device varies in accordance with the amount of the stored electricity on same driving or braking conditions, the variation of the torque is not higher than 20% relative to a standard value of total torque obtained by summing up torque of the electric motor and torque of the hydraulic motor on the same driving or braking conditions.

When the variation of the swing torque on the same conditions is suppressed to 20% or lower on the basis of the swing feeling of the swing structure obtained by an operator, strict energy management can be executed without any wrong feeling on operation given to the operator.

Advantageous Effects of Invention

According to the invention, as soon as the amount of electricity stored in the electric storage device reaches the regeneration prohibition value or the swing prohibition value set in advance, driving and braking the swing structure using the first electric motor is suspended, and the system is changed over to a system in which the swing structure is driven and braked using only the hydraulic motor. It is therefore possible to continue to carry out work using the construction machine. In addition, on this occasion, the second electric motor is motored or engine-driven to accelerate charging/discharging the electric storage device so that the mode can be quickly resumed to a normal mode for driving the swing structure using both the first electric motor and the hydraulic motor.

DESCRIPTION OF EMBODIMENTS

A construction machine according to the invention will be described below while a hydraulic excavator is used as an example. The invention is not limited to the application to the hydraulic excavator but it may be applied to any work machine or any construction machine having a swing structure.

Figure 1:
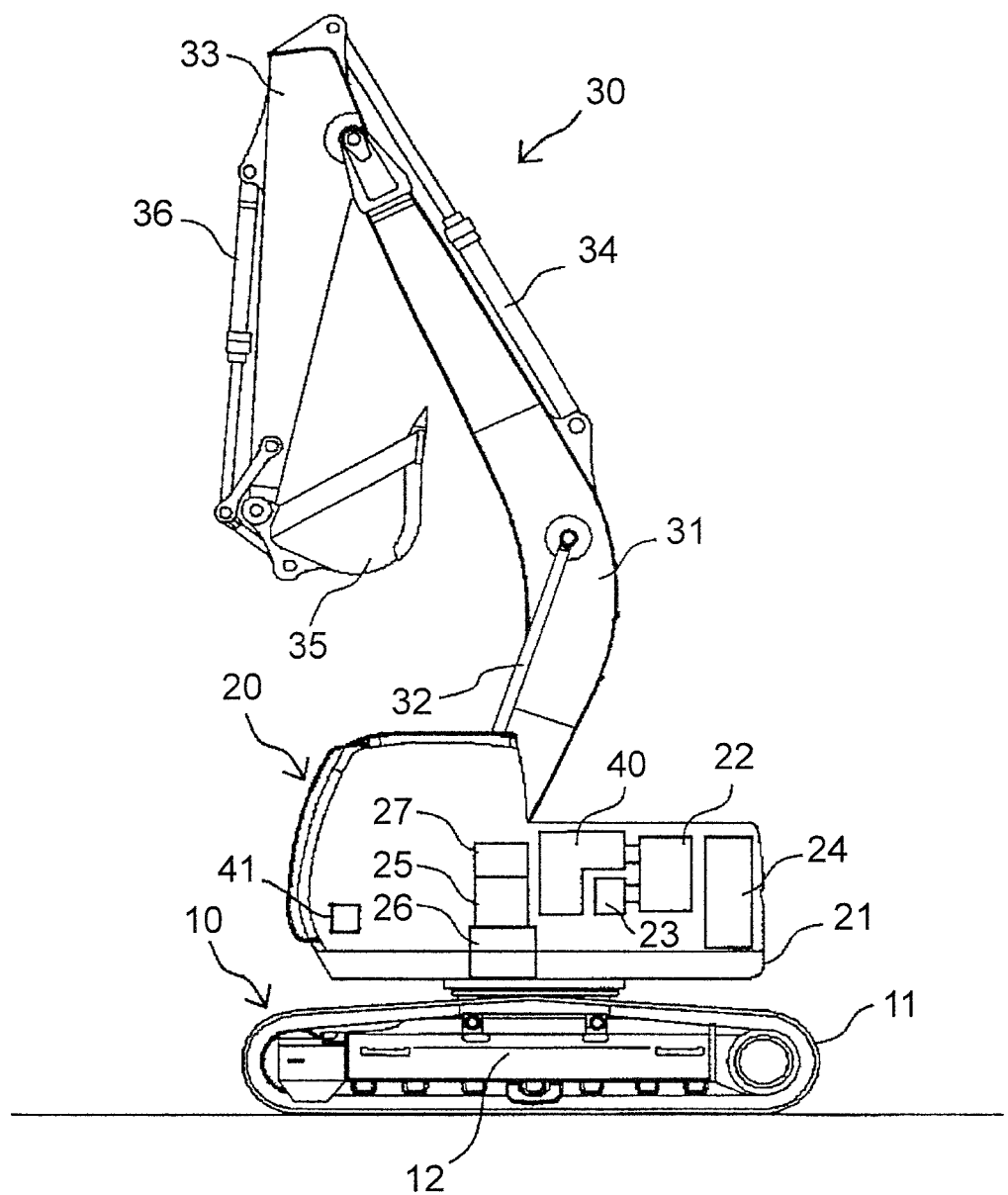
FIG. 1 A side view of a hydraulic excavator according to an embodiment.

As shown in FIG. 1, the hydraulic excavator according to this example has a lower traveling base 10, an upper swing structure 20 which is swingably provided on the lower traveling base 10, and an excavator mechanism 30 consisting of a multijoint link mechanism having one end coupled with the upper swing structure 20.

The lower traveling base 10 has a pair of left and right crawlers 11 and a pair of left and right crawler frames 12 (only one side is shown in FIG. 1). The crawlers 11 are driven by a pair of traveling hydraulic motors 13 and 14 shown in FIG. 2, through not-shown deceleration mechanisms etc., respectively and individually.

Figure 2:
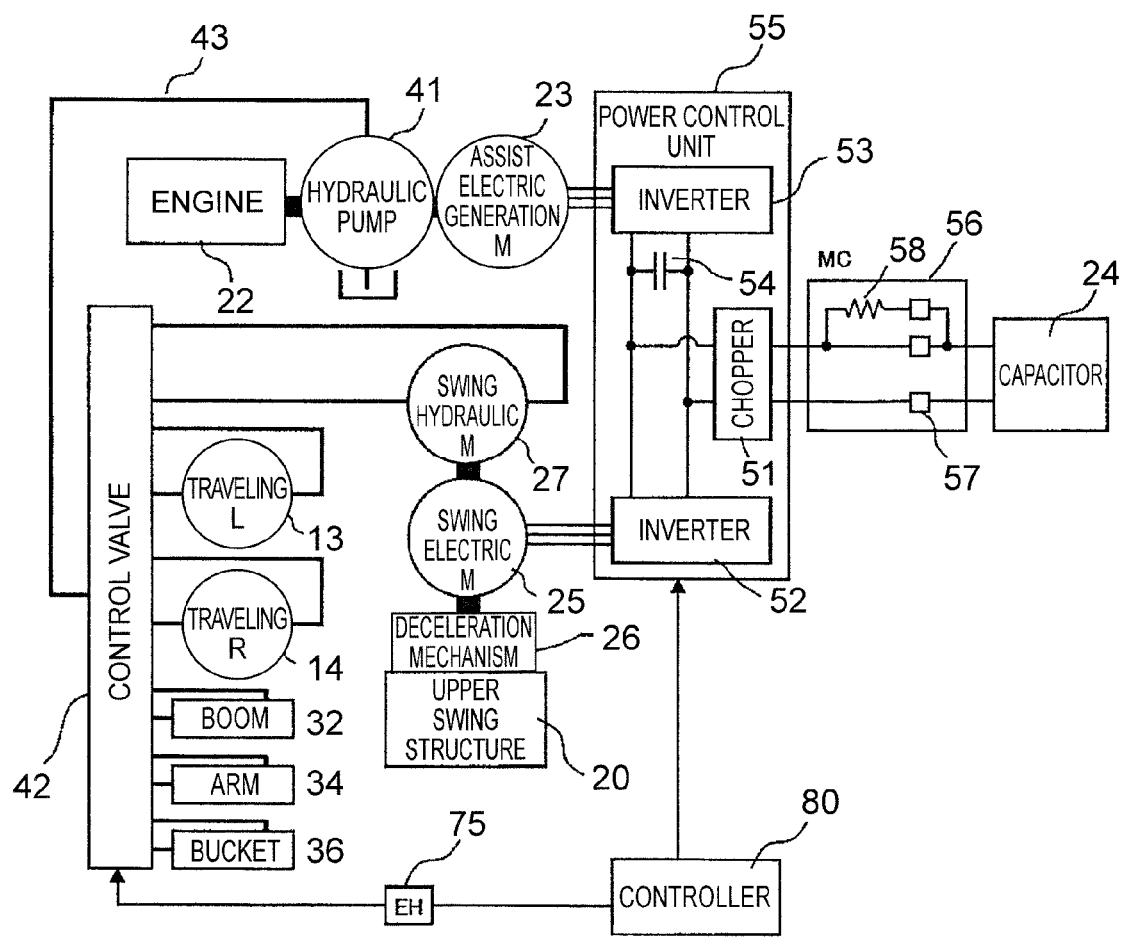
FIG. 2 A system configuration diagram of the hydraulic excavator according to the embodiment.

The upper swing structure 20 has a swing frame 21 which is swingably attached to the lower traveling base 10. The swing frame 21 is mounted with an engine 22, an assist electric generation motor (second electric motor) 23 which is driven by the engine 22, a swing electric motor (first electric motor) 25, a capacitor 24 which is an electric storage device connected to the assist electric generation motor 23 and the swing electric motor 25, and a swing hydraulic motor 27. In addition, the swing frame 21 is also mounted with a hydraulic system 40 including a hydraulic pump 41 and a control valve 42, and a swing control system including a power control unit 55 and a controller 80, as shown in FIG. 2. The swing frame 21 includes a deceleration mechanism 26 for decelerating the rotation of the swing electric motor 25. The swing frame 21 is swingably attached to an upper portion of the lower traveling base 10 through a swing mechanism which is driven by the drive forces of the swing electric motor 25 and the swing hydraulic motor 27. Although the capacitor 24 is used as an electric storage device in this embodiment, a storage battery may be used or both the capacitor and the storage battery may be used together.

The excavator mechanism 30 is constituted by a boom 31, a boom cylinder 32 for driving the boom 31, an arm 33 pivotally supported on the vicinity of a front end portion of the boom 31 so as to be rotatable, an arm cylinder 34 for driving the arm 33, a bucket 35 pivotally supported on a front end of the arm 33 so as to be rotatable, and a bucket cylinder 36 for driving the bucket 35. A base end portion of the boom 31 is pivotally supported on the swing frame 21 so as to be rotatable. The boom 31, the arm 33 and the bucket 35 are driven vertically around their connecting shafts so as to carry out work such as excavation.

Figure 3:
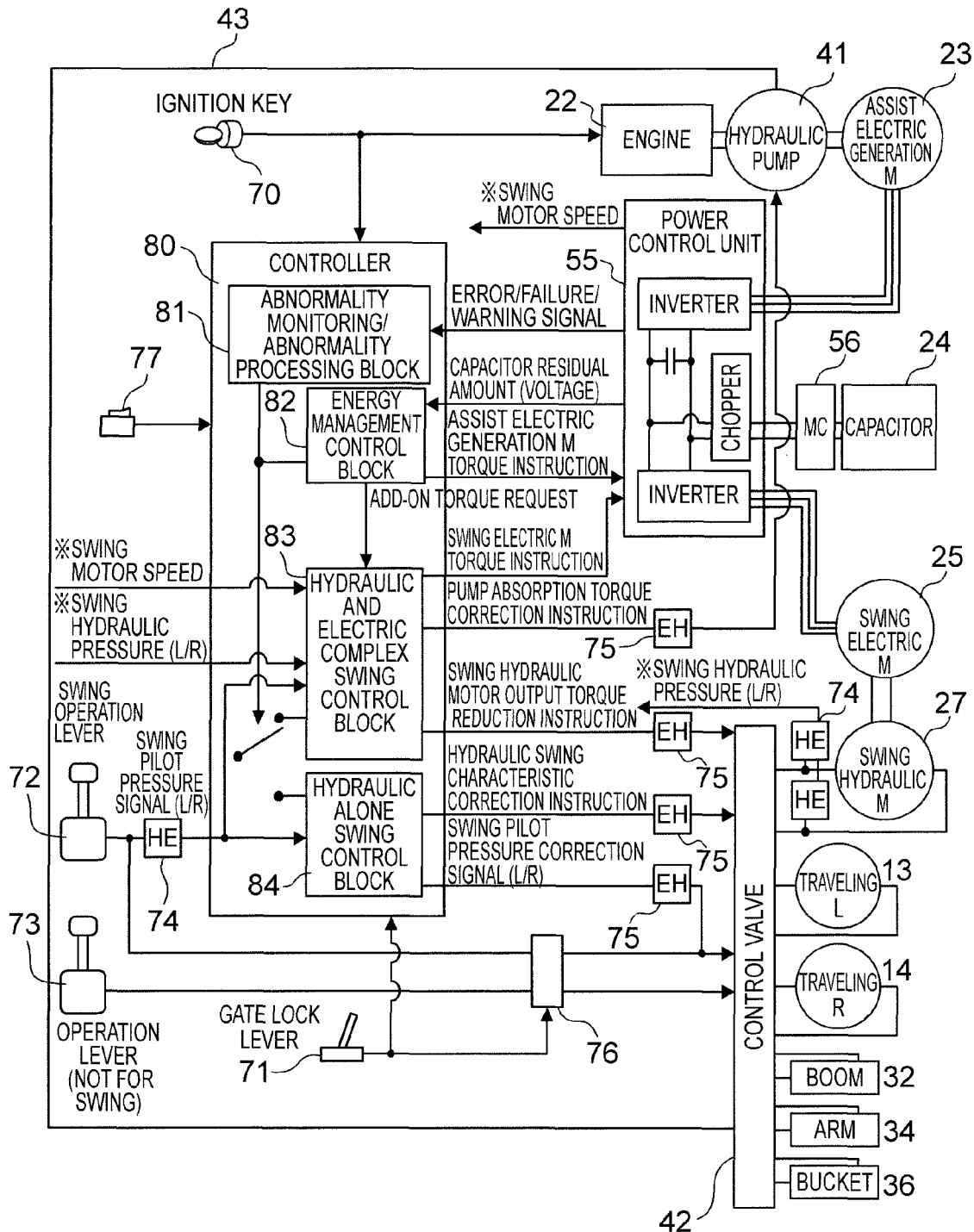
FIG. 3 A detailed system configuration diagram of the hydraulic excavator according to the embodiment.

The hydraulic system 40 shown in FIG. 1 is constituted by the engine 22; the hydraulic pump 41 which is driven by the engine 22; traveling hydraulic motors 13 and 14, the swing hydraulic motor 27, the boom cylinder 32, the arm cylinder 34, and the bucket cylinder 36 which are driven by hydraulic oil ejected from the hydraulic pump 41; and the control valve 42 which changes over the supply amount and the supply direction of the hydraulic oil supplied to each of these hydraulic actuator, based on an instruction from an operation lever 72 (see FIG. 3).

The control valve 42 according to the embodiment is designed so that the bleed-off opening area when the operation amount of the swing operation lever is in an intermediate region (between neutral and maximum) is made larger than that in a normal machine, and the driving torque of the swing hydraulic motor 27 (the torque in a direction to drive the upper swing structure 20) when the operation amount is in the intermediate region becomes smaller than that in the normal machine. In addition, the control valve 42 is designed so that the meter-out opening area when the operation amount of the swing operation lever is in the intermediate region is made larger than that in the normal machine, and the braking torque of the swing hydraulic motor 27 (the torque in a direction to brake the upper swing structure 20) when the operation amount is in the intermediate region becomes smaller than that in the normal machine. The normal machine means a construction machine which does not have an assist electric motor but drives a driven portion including a swing structure only by a hydraulic mechanism.

As shown in FIG. 2, a controller 80 for outputting a control signal corresponding to an instruction from the operation lever 72 (see FIG. 3) to the aforementioned control valve 42 and the power control unit 55 which controls charging/discharging the capacitor 24 is provided as the swing control system 41. The power control unit 55 controls the supply of electric power from the capacitor 24 to the assist electric generation motor 23 and the swing electric motor 25, and charging the capacitor 24 with AC electric power recovered from the assist electric generation motor 23 and the swing electric motor 25. The power control unit 55 is constituted by a chopper 51 which boosts DC electric motor supplied from the capacitor 24 to a predetermined bus voltage, an inverter 52 for driving the swing electric motor 25, an inverter 53 for driving the assist electric generation motor 23, and a smoothing capacitor 54 provided for stabilizing the bus voltage. Incidentally, the reference sign 56 in the drawing represents a main contactor. This main contactor 56 consists of a main relay 57 and an inrush current preventing circuit 58.

The rotation shaft of the swing electric motor 25 and the rotation shaft of the swing hydraulic motor 27 are linked to each other to drive the upper swing structure 20 with total torque obtained by summing up torques generated by these motors. The capacitor 24 is charged or discharged in accordance with the driving states of the assist electric generation motor 23 and the swing electric motor 25 (whether they engage in motor driving or regeneration).

A shown in FIG. 3, the controller 80 consists of an abnormality monitoring/abnormality processing control block 81, an energy management control block 82, a hydraulic and electric complex swing control block 83, a hydraulic alone swing control block 84, and a changeover unit 85 for changing over between the hydraulic and electric complex swing control block 83 and the hydraulic alone swing control block 84. An error/failure/warning signal outputted from the power control unit 55 is supplied to the abnormality monitoring/abnormality processing control block 81. The energy management control block 82 receives a capacitor residual quantity signal outputted from the power control unit 55 and outputs an assist electric generation motor torque instruction to the power control unit 55 and an add-on torque request to the hydraulic and electric complex swing control block 83. The hydraulic and electric complex swing control block 83 receives a swing pilot pressure signal outputted from the swing operation lever 72 and converted into an electric signal by a hydraulic to electric signal conversion device (e.g. pressure sensor) 74, a swing motor speed outputted from the power control unit 55, and a swing hydraulic pressure outputted from the control valve 42 and converted into a hydraulic pilot signal by an electric to pressure signal conversion device (e.g. electromagnetic proportional valve) 75, and outputs a swing electric motor torque instruction to the power control unit 55, a pump absorption torque correction instruction to the hydraulic pump 41 and a swing hydraulic pressure motor output torque reduction instruction to the control valve 42. The hydraulic alone swing control block 84 receives the swing pilot pressure signal outputted from the swing operation lever 72 and converted into an electric signal by the hydraulic to electric signal conversion device 74, and outputs a hydraulic swing characteristic correction instruction and a swing pilot pressure correction signal to the control valve 42. The changeover unit 85 can be changed over not only automatically by the controller 80 in accordance with the driving state of the upper swing structure 20 and the amount of electricity stored in the capacitor 24 but also manually by a hydraulic alone swing mode fixation switch 77 additionally provided in the controller 80, as will be described later. Incidentally, the reference sign 71 in the drawing represents a gate lock lever, and the reference sign 76 represents a pilot pressure signal shutoff valve which is operated by the gate lock lever 71.

In the state where there is no abnormality in the system as a whole but the swing electric motor 25 can be driven, the upper swing structure 20 is swung and controlled by the hydraulic and electric complex swing control block 83. That is, when an operator operates the swing operation lever 72, a hydraulic pilot signal corresponding to the direction of the operation and the amount of the operation is generated and supplied to the control valve 42, and also supplied to the controller 80 through the hydraulic to electric signal conversion device 74. In this manner, the control valve for the swing hydraulic motor is opened to drive the swing hydraulic motor 27 while the swing electric motor 25 is supplied with electric power from the capacitor 24 and driven thereby.

Figure 4:
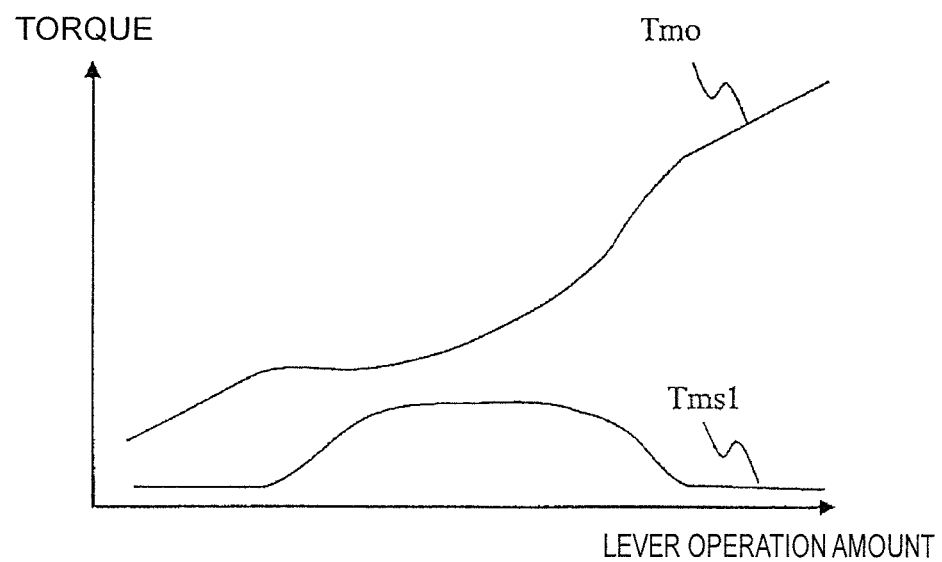
FIG. 4 A graph showing the relation among an amount of lever operation, driving torque of a hydraulic motor and driving torque of an electric motor.

As described above, when the operation amount of the swing operation lever 72 is in the intermediate region during drive, the control valve 42 according to the embodiment makes the bleed-off opening area larger than that in the normal machine so as to reduce the driving torque. Also when the operation amount of the swing operation lever 72 is in the intermediate region during braking, the control valve 42 makes the meter-out opening area larger than that in the normal machine so as to reduce the braking torque. Accordingly, in the hydraulic system 40 according to the embodiment, the driving torque of the swing hydraulic motor 27 becomes smaller than that in the background-art hydraulic machine (normal machine). The controller 80 computes a swing electric motor torque instruction indicating driving torque large enough to drive the swing electric motor 25 so as to compensate the reduction in the driving torque of the swing hydraulic motor 27. FIG. 4 schematically shows driving torque Tms1 of the swing electric motor 25 and driving torque Tmo of the swing hydraulic motor 27 corresponding to the operation amount on the swing operation lever 72.

The hydraulic and electric complex swing control block 83 adds add-on torque requested from the energy management control block 82 to the driving torque Tms1 of the swing electric motor 25 and the driving torque Tmo of the swing hydraulic motor 27 corresponding to the operation amount on the swing operation lever 72, and outputs the addition result to the power control unit 55. The add-on torque is added onto the driving torque Tms1 of the swing electric motor 25. A method for computing the swing electric motor torque instruction including the add-on torque will be described later.

The amount of electricity stored in the capacitor 24 increases/decreases due to the difference between the electric energy consumed by the swing electric motor 25 during acceleration and the electric energy regenerated by the swing electric motor 25 during deceleration. The energy management control block 82 serves to control this amount of electricity stored in the capacitor 24 within an appropriate range. The energy management control block 82 gives a power generation instruction or an assist instruction to the assist electric generation motor 23 so as to control the amount of electricity stored in the capacitor 24 within the appropriate range.

Figure 5:
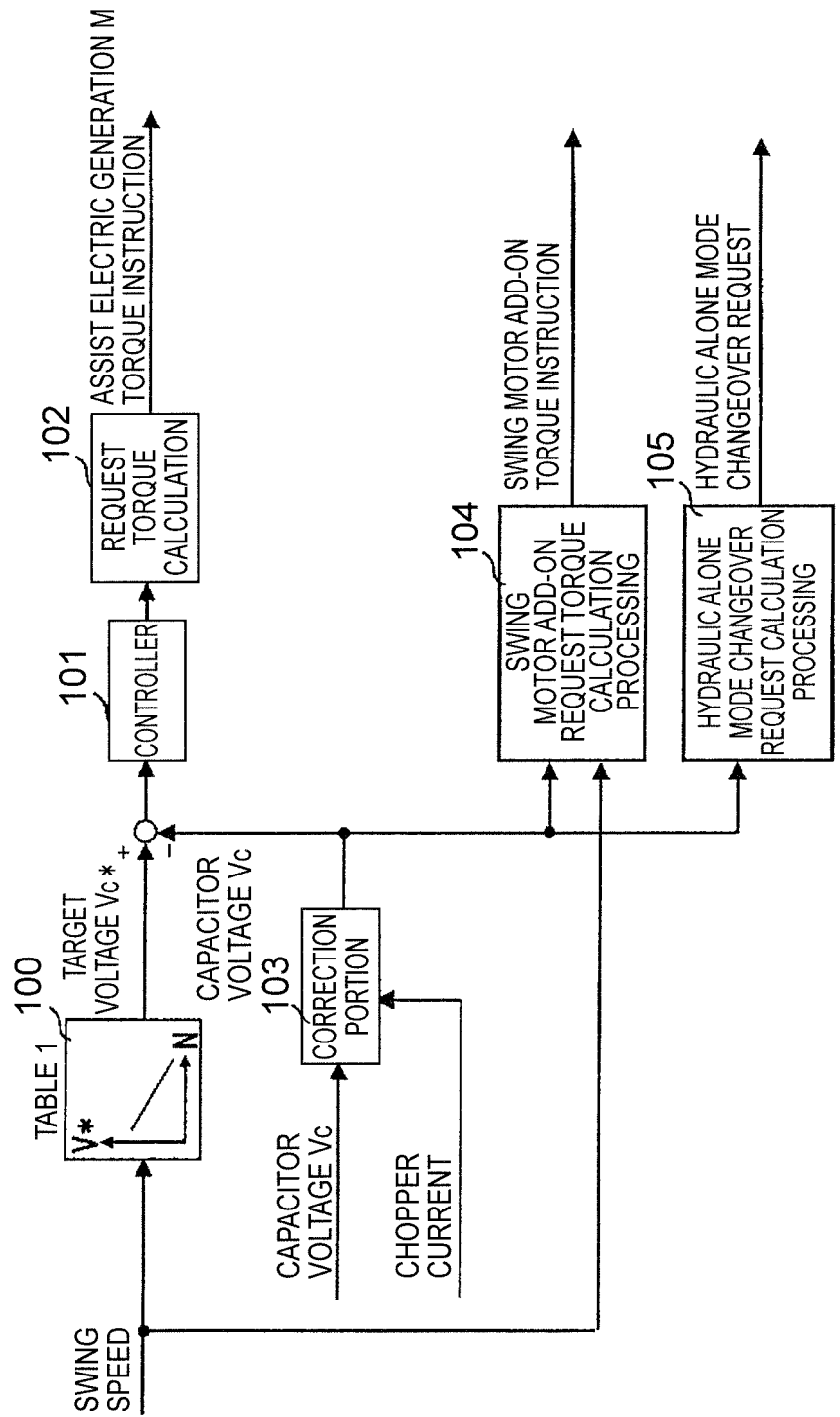
FIG. 5 A control block diagram of an energy management portion.
Figure 6:
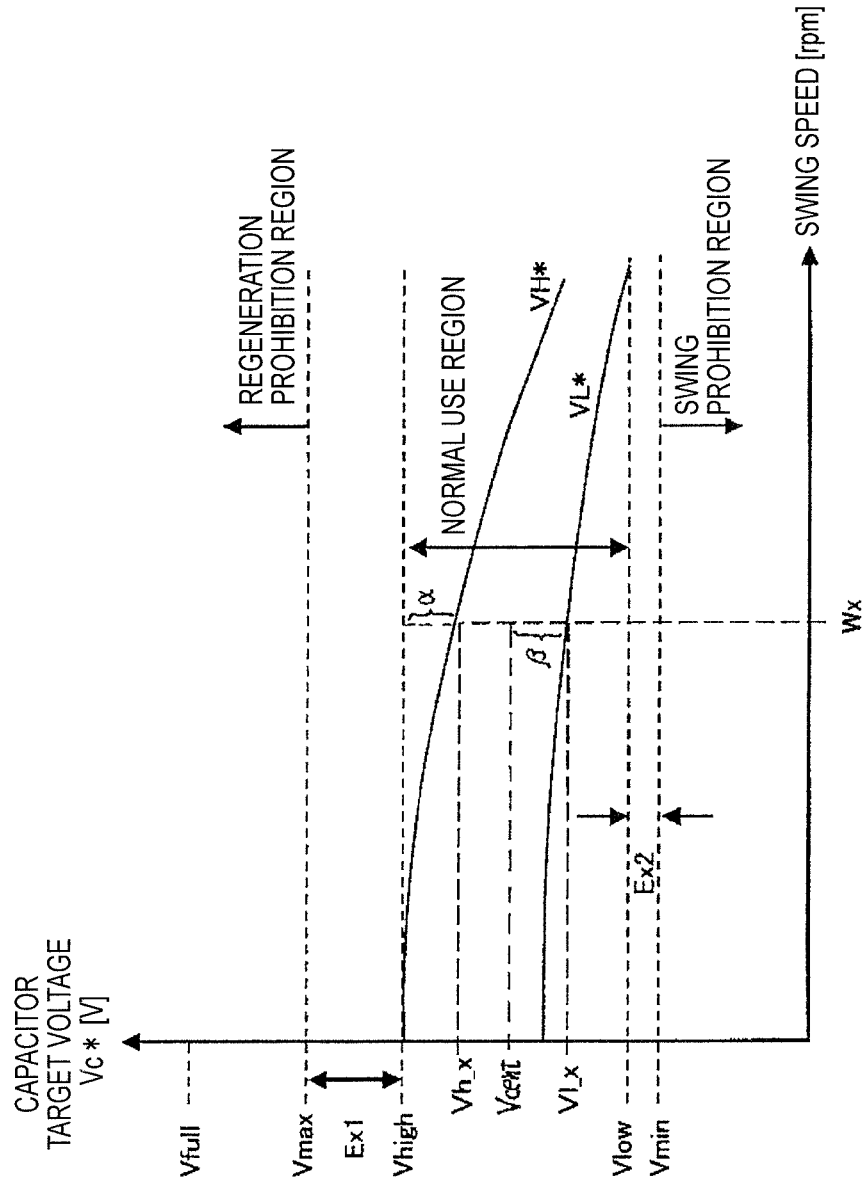
FIG. 6 An explanatory graph of a normal use region, a regeneration prohibition region and a swing prohibition region stored in a controller, a discharge instruction and a charge instruction.

FIG. 5 shows a method for controlling the assist electric generation motor 23 in the energy management control block 82. In this example, the capacitor voltage Vc is controlled for a capacitor target voltage Vc* by motoring or regenerating operation on the assist electric generation motor 23. The capacitor target voltage Vc* is set to depend on the kinetic energy of the upper swing structure 20. Here, as shown in FIG. 6, the target voltage Vc* of the capacitor 24 is set in the form of a charge instruction VL* and a discharge instruction VH* in advance, and held in a table corresponding to each swing speed. For example, regenerated energy that can be obtained during regenerating operation becomes larger when the kinetic energy is high, that is, when the swing speed is high, than when the kinetic energy is low. For that situation, during swing motoring, the capacitor target voltage Vc* is set to be so low that the state of charge in the capacitor can be made low. In the same manner, during regenerating operation, the capacitor target voltage Vc* is set to be so high that the state of charge in the capacitor can be made higher for the next motoring as the kinetic energy is lower, that is, the swing speed is lower.

If the capacitor target voltage Vc* is set in the aforementioned manner, the assist electric generation motor 23 can be controlled to perform motoring at its maximum output in the case where the capacitor voltage Vc is higher than (Vh_x+α) when the swing speed is Wx in FIG. 6. In addition, in the case where the capacitor voltage Vc is lower than (Vl_x−β) when the swing speed is Wx, the assist electric generation motor 23 can be controlled to perform motor generating operation at its maximum output. On the other hand, in the case where the capacitor voltage Vc is in a range of Vl_x≤Vc≤Vh_x, the assist electric generation motor 23 is not driven but the capacitor 24 can be charged or discharged with electric energy corresponding to the motoring or the regenerating operation on the swing electric motor 25.

In FIG. 6, the capacitor target voltages VL* and VH* which mean a charge instruction and a discharge instruction to and from the capacitor 24 should be set to use the normal use region of the capacitor 24 effectively. That is, from the point of view of safety or the length of life, electric energy can be used more effectively to improve the efficiency as the capacitor voltage Vc is used to the utmost within a range of from the minimum voltage Vmin to the maximum voltage Vmax when the normal use region corresponds to the voltage range where the capacitor 24 can be used appropriately. Therefore, the energy efficiency can be more improved as the capacitor voltage when the capacitor is charged with the regenerated energy is closer to Vmax and the capacitor voltage when the capacitor is discharged by the motoring is closer to Vmin. Practically, however, the capacitor voltage is set at a value with a margin corresponding to predetermined regenerated energy Ex1 or predetermined motoring energy Ex2, so as to be prepared for the case where the capacitor 24 is successively charged by regeneration due to swing work, for example, in an inclined site or the like, or the case where the capacitor 24 is successively discharged due to pressing work or the like. According to this system, as will be described later, it is possible to change over the mode to a hydraulic motor alone mode even when the capacitor residual amount is out of a predetermined range. Thus, the regenerated energy Ex1 and the motoring energy Ex2 can be set at small values so that the capacitor 24 can be miniaturized. Incidentally, a voltage range not lower than the maximum voltage Vmax corresponds to a regeneration prohibition region where charging with electric energy regenerated from the assist electric generation motor 23 and the swing electric motor 25 is prohibited, and a voltage range not higher than the minimum voltage Vmin corresponds to a swing prohibition region where swing work of the upper swing structure 20 is prohibited. The controller 80 stores the normal use region, the regeneration prohibition region and the swing prohibition region shown in FIG. 6.

Return to FIG. 5. A deviation between the computed capacitor target voltage Vc* and the capacitor voltage Vc is multiplied by a proportional gain in a controller 101 so as to calculate an output to charge/discharge the capacitor 24. In addition, in a request torque calculation unit 102, the output calculated in the controller 101 is divided by the rotation speed of the assist electric generation motor 23 so as to be converted into an assist electric generation motor torque instruction, which is outputted to the power control unit 55. Here, assume that the capacitor voltage Vc is a value in which a voltage drop caused by an internal resistance value has been corrected by a correction portion 103.

Figure 7:
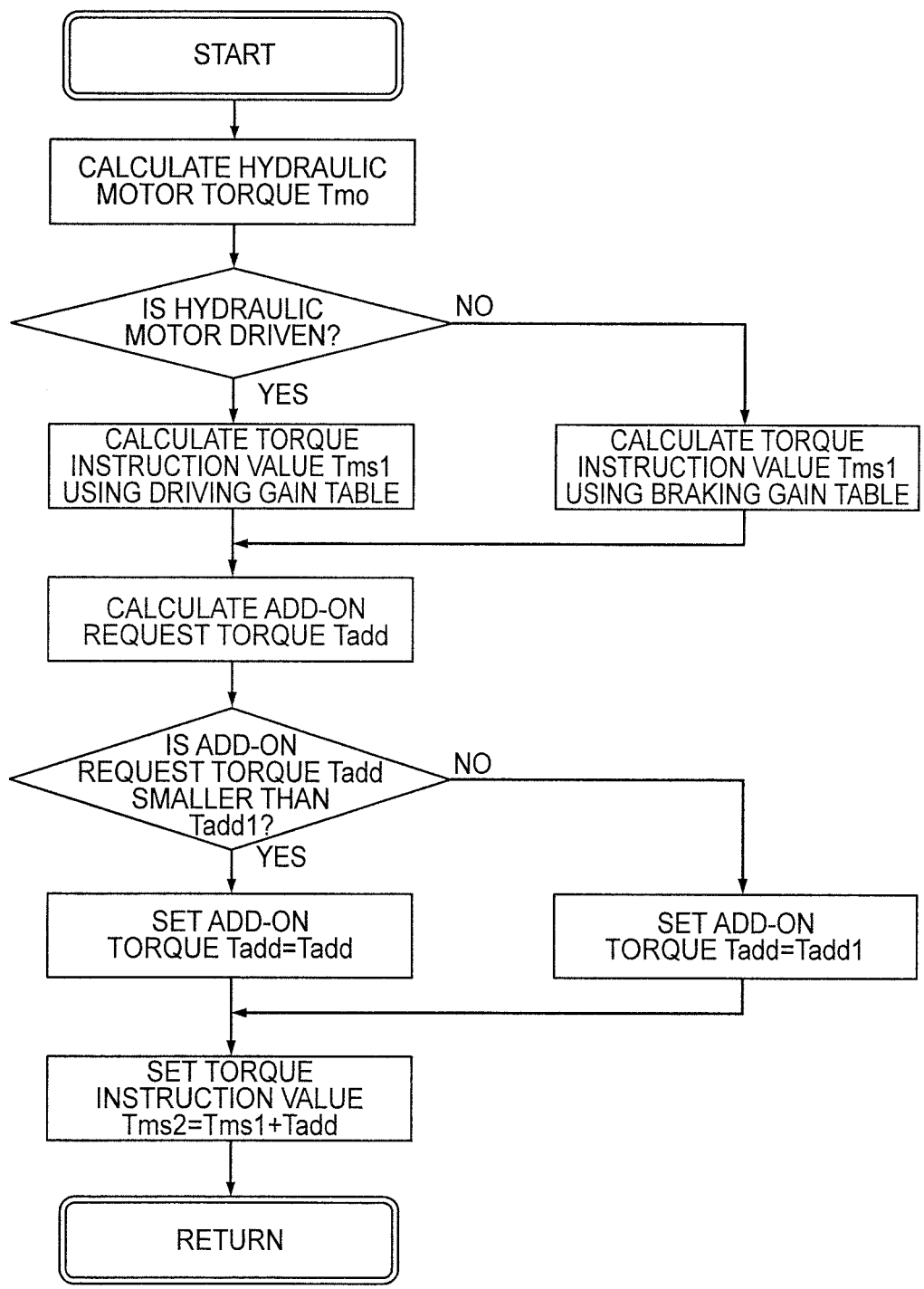
FIG. 7 A chart showing a processing flow for computing a torque instruction value for a swing electric motor.

Next, the processing of the swing motor add-on request torque calculation processing block 104 shown in FIG. 5 will be described along the flow chart shown in FIG. 7. In this processing, torque small enough not to give wrong swing feeling to the operator is added onto the driving torque of the swing electric motor 25 to adjust the amount of electricity stored in the capacitor 24 when the amount of electricity stored in the capacitor 24 cannot be kept within a predetermined range only by charge/discharge derived from the drive of the assist electric generation motor 23. Thus, it is possible to make it difficult for the amount of electricity stored in the capacitor 24 to reach the regeneration prohibition region and the swing prohibition region.

First, hydraulic motor torque Tmo is calculated from the difference between A-port pressure and B-port pressure in the swing hydraulic motor 27. Here, the A port and the B port of the swing hydraulic motor 27 are two ports serving as an inlet and an outlet for hydraulic oil in the swing hydraulic motor 27. Next, determination is made as to whether the swing hydraulic motor 27 is being driven or braked. During drive, a gain is calculated using a driving gain table set in accordance with the amount of swing operation, and the hydraulic motor torque is multiplied by the calculated driving gain. The value obtained thus is set as an electric motor torque instruction value Tms1. In the same manner, during braking, a gain is calculated using a braking gain table set in accordance with the amount of swing operation, and the hydraulic motor torque is multiplied by the calculated gain. The value obtained thus is set as an electric motor torque instruction value Tms1. This electric motor torque instruction value Tms1 is set to be almost equal to torque of a hydraulic motor in a background-art machine. Thus, the calculated electric motor torque instruction value Tms1 increases when the operation amount on the swing operation lever is in an intermediate region.

Figure 8:
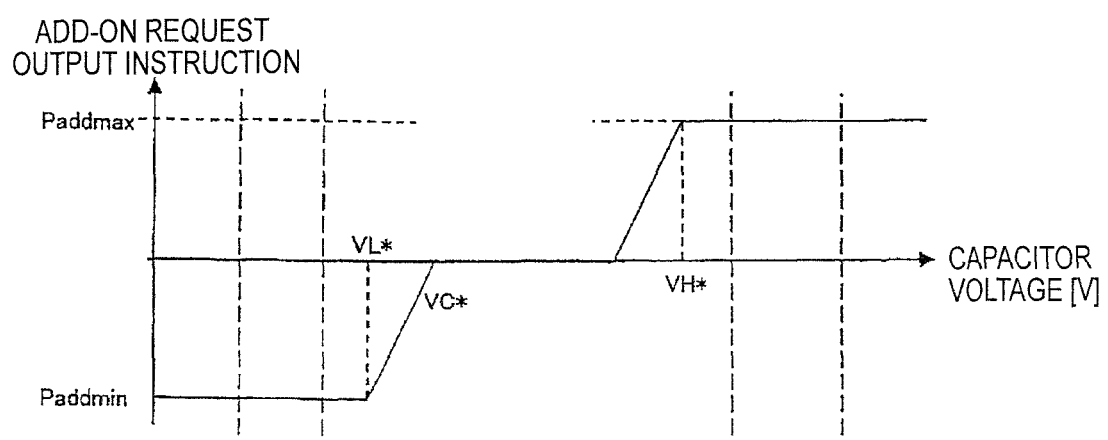
FIG. 8 A graph showing the relation of an add-on request output instruction value to a capacitor voltage.

Next, add-on request torque Tadd is calculated from the state of charge in the capacitor 24. In this embodiment, charge/discharge electric power to be inputted/outputted is defined in accordance with the capacitor voltage Vc, and divided by the swing speed so as to be converted into add-on request torque. FIG. 8 shows a table for setting an add-on request output instruction for the capacitor voltage Vc. During swing drive, an add-on request output is set so that discharge can be done with predetermined discharge power Paddmax [kW] when the capacitor voltage is not lower than VH1*. On the other hand, during swing regeneration, an add-on request output is set so that charge can be done with predetermined charge power Paddmin [kW] when the capacitor voltage is not higher than VL*.

Although an add-on request output is set both for drive and for braking in the example of FIG. 8, it may be set either for drive or for braking in accordance with the system. Ordinarily the maximum output of the swing electric motor 25 is higher than that of the assist electric generation motor 23. Therefore, energy management is carried out more easily than when the amount of electricity stored in the capacitor 24 is controlled only by the assist electric generation motor 23. In addition, from the point of view of efficiency, the regenerated energy stored in the capacitor during braking of the swing electric motor 25 can be used more effectively when the swing electric motor 25 is accelerated for swing than when the assist electric generation motor 23 is driven to assist the pump output.

Next, determination is made as to whether the calculated add-on request torque Tadd exceeds an upper limit value Tadd1 set in advance or not. When the add-on request torque Tadd exceeds the upper limit value Tadd1, the add-on request torque Tadd is set to be equal to Tadd1 (Tadd=Tadd1). The upper limit value Tadd1 is set within a range where there will be no difference between the feeling of swing given to an operator when the swing electric motor 25 is driven with the value obtained by adding the add-on request torque Tadd to the driving torque Tms1 of the swing electric motor 25 and the feeling of swing given to the operator when the swing electric motor 25 is driven with the driving torque Tms1 of the swing electric motor 25 without adding the add-on request torque Tadd thereto. According to experiments carried out by the present inventors, it has been found that most operators feel nothing wrong even when torque about 20% relative to the driving torque Tms1 of the swing electric motor 25 is added thereto. Here, assume that the upper limit value of the add-on request torque is a value (Tadd1=K1·Tms1) obtained by multiplying the hydraulic motor torque instruction Tms1 by a gain K1. Thus, the add-on torque Tadd is added to the electric motor torque instruction value Tms1 so as to obtain an electric motor torque instruction value Tms2 (=Tms1+Tadd).

Figure 9:
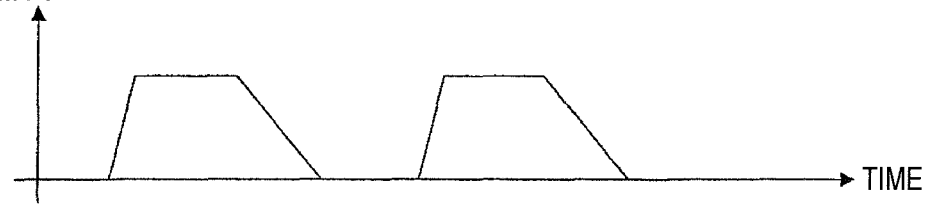
FIG. 9 A graph showing changes of hydraulic motor torque, swing electric motor torque and add-on torque from the start of an upper swing structure to the stop thereof.
Figure 9:
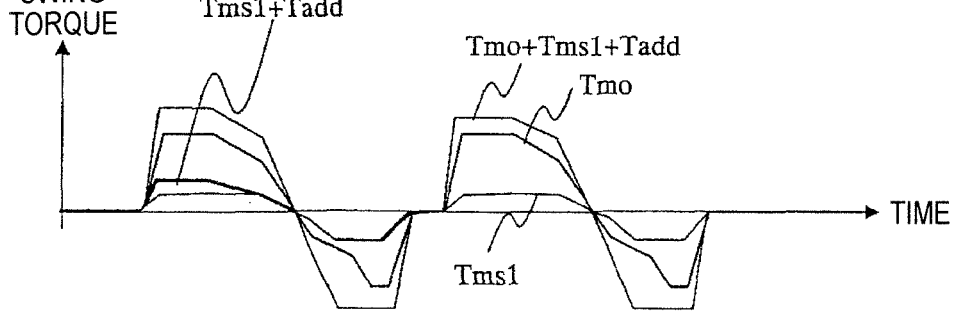
Figure 9:
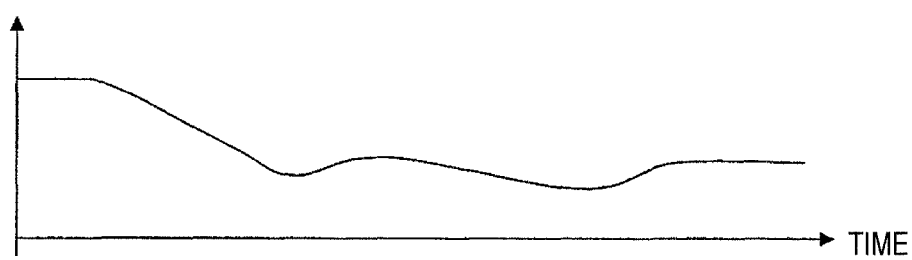

The obtained electric motor torque instruction value Tms2 is outputted to the power control unit 55 from the hydraulic and electric complex swing control block 83. FIG. 9 shows the changes of the hydraulic motor torque Tmo, the swing electric motor torque Tms1 and the add-on torque Tadd added to the swing electric motor torque Tms1, from the start of the upper swing structure 20 to the stop thereof. When control is made in such a manner, the state of electricity stored in the capacitor 24 can be easily managed within an appropriate range, and the number of times to change over the mode to the hydraulic alone swing mode as will be described below can be made as small as possible. In addition, it is possible to achieve a system configuration in which the capacity of the capacitor 24 is reduced. Further, energy can be used effectively to improve the fuel consumption without any wrong feeling on operation given to an operator.

Next, description will be made on a hydraulic alone mode changeover request calculation processing block 105 in FIG. 5. When the amount of electricity stored in the capacitor 24 is out of a predetermined range in spite of addition with the torque of the swing electric motor 25, the mode is changed over from the hydraulic and electric complex swing mode to the hydraulic alone mode in order to prevent the capacitor 24 from being charged and discharged due to driving and braking of the swing electric motor 25. Setting is done to change over the mode to the hydraulic alone mode based on the state of electricity stored in the capacitor 24. Output is made in two stages in such a manner that a regeneration prohibition flag is outputted when the amount of the stored electricity is large, and a swing prohibition flag is outputted when the amount of the stored electricity is small.

Figure 10A:
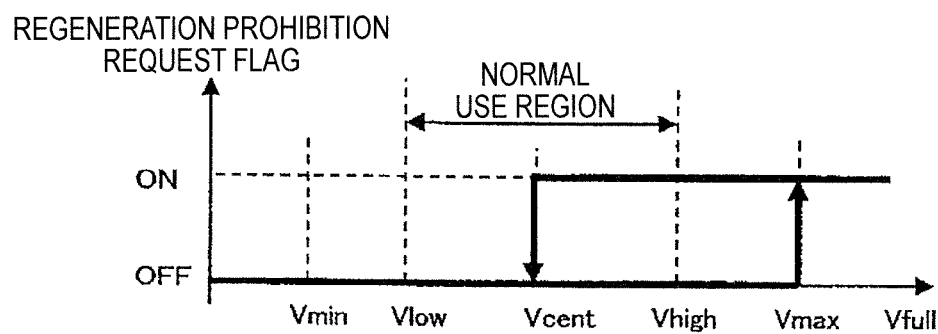
FIG. 10 Graphs showing output examples of hydraulic alone mode changeover requests.
Figure 10B:
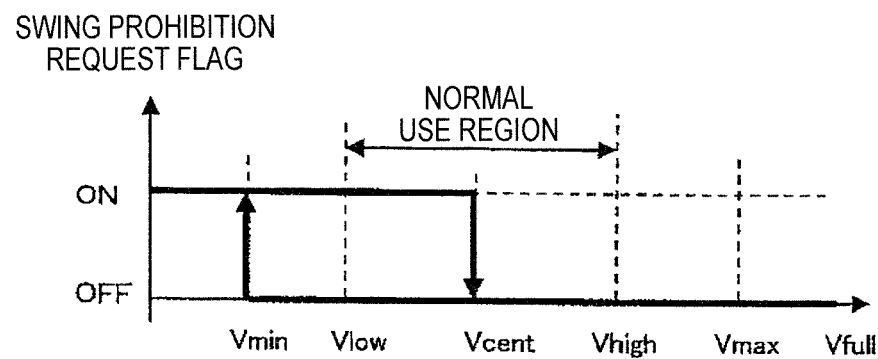

FIG. 10(*a*) shows an example of setting of the regeneration prohibition flag. In the case of this example, as soon as the capacitor voltage reaches a threshold Vmax of the regeneration prohibition region, the regeneration prohibition flag is turned ON to change over the mode to the hydraulic alone mode. When the capacitor voltage returns to a central value Vcent of the normal use region, the regeneration prohibition flag is turned OFF to cancel the hydraulic alone mode. FIG. 10(*b*) shows an example of setting of the swing prohibition flag. In this case, as soon as the voltage reaches a threshold Vmin of the swing prohibition region, the swing prohibition flag is turned ON to change over the mode to the hydraulic alone mode. When the capacitor voltage returns to the central value Vcent of the normal use region, the swing prohibition flag is turned OFF to cancel the hydraulic alone mode. On this occasion, in order to make shock during operation as small as possible, the flag is turned ON and OFF to change over the mode at the timing when swing motion and operation are not carried out.

In addition to control in FIGS. 10(*a*) and (*b*), another control method may be taken in such a manner that a second regeneration prohibition flag is changed over to ON as soon as the capacitor voltage reaches a predetermined voltage value, for example, Vfull, not lower than the threshold Vmax of the regeneration prohibition region. When the capacitor voltage reaches Vfull, judgment is made that there occurs abnormality in the capacitor 24. Thus, the second regeneration prohibition flag is changed over from OFF to ON immediately regardless of whether the swing motion is being carried out or not.

The mode is changed over from the hydraulic and electric complex swing mode to the hydraulic alone swing mode based on a request from the aforementioned energy management control block 82. However, the mode may be also changed over when there occurs abnormality in an electric system including a power control unit, an electric motor, a capacitor, etc. On this occasion, the mode is changed over from the hydraulic and electric complex swing mode to the hydraulic alone swing mode based on the judgment of the abnormality monitoring/abnormality processing block 81.

There is a possibility that mode changeover between the hydraulic and electric complex swing mode and the hydraulic alone swing mode may lead to light shock on operation due to the changeover operation of a valve on a hydraulic circuit during the mode changeover. Therefore, when the contents of an error signal is not severe and there is no emergency for immediate changeover, the changeover is carried out, for example, at the timing when swing motion and operation are not carried out or at an idling period when operation including that in the front is not carried out at all. As for abnormality such as overcurrent abnormality in an inverter, that may cause damage to a system or that may lead to severe failure or disaster, the electric system is suspended immediately and the mode is changed over to the hydraulic alone swing mode even during operation.

Under the hydraulic alone swing control, charge or discharge is carried out using the assist electric generation motor 23 till the capacitor voltage returns to a predetermined voltage value. When the capacitor voltage is larger than the predetermined value and the control is changed over to the hydraulic alone swing control, the assist electric generation motor 23 is controlled to be assist-driven at its maximum output till the capacitor voltage falls down to the predetermined voltage (Vcent in this example). On the contrary, when the capacitor voltage falls below a predetermined value and the control is changed over to the hydraulic alone swing control, the assist electric generation motor 23 is controlled and driven to generate electric power at its maximum output till the capacitor voltage rises to the predetermined voltage (Vcent in this example).

When an error signal is cancelled by predetermined error processing or spontaneously during the hydraulic alone swing control, operation of resumption to the hydraulic and electric complex swing mode is carried out, for example, at the timing when swing motion and operation are not carried out or at an idling period when operation including that in the front is not carried out at all.

In this manner, when the driving mode of the upper swing structure 20 is changed over from the hydraulic and electric complex swing mode to the hydraulic alone swing mode as soon as the capacitor voltage reaches a predetermined regeneration prohibition value or a predetermined swing prohibition value, the upper swing structure 20 can be continuously driven. Thus, high workability can be kept. In addition, when the driving mode of the upper swing structure 20 is changed over from the hydraulic and electric complex swing mode to the hydraulic alone swing mode, the assist electric generation motor 23 is fully driven to accelerate the charge/discharge of the capacitor 24 so that the mode can be resumed to the hydraulic and electric complex swing mode rapidly. Thus, it is possible to improve the fuel consumption, reduce the noise and reduce the amount of exhaust gas.

REFERENCE SIGNS LIST

10 . . . lower traveling base, 11 . . . crawler, 12 . . . crawler frame, 13 . . . right traveling hydraulic motor, 14 . . . left traveling hydraulic motor, 20 . . . upper swing structure, 21 . . . swing frame, 22 . . . engine, 23 . . . assist electric generation motor, 24 . . . capacitor, 25 . . . swing electric motor, 26 . . . deceleration mechanism, 27 . . . swing hydraulic motor, 30 . . . excavator mechanism, 31 . . . boom, 32 . . . boom cylinder, 33 . . . arm, 34 . . . arm cylinder, 35 . . . bucket, 36 . . . bucket cylinder, 37 . . . swing spool, 40 . . . hydraulic system, 41 . . . hydraulic pump, 42 . . . control valve, 43 . . . hydraulic piping, 51 . . . chopper, 52 . . . inverter for swing electric motor, 53 . . . inverter for assist electric generation motor, 54 . . . smoothing capacitor, 55 . . . power control unit, 56 . . . main contactor, 57 . . . main relay, 58 . . . inrush current preventing circuit, 70 . . . ignition key, 71 . . . gate lock lever, 72 . . . swing operation lever, 73 . . . operation lever (not for swing), 74 . . . hydraulic to electric signal conversion device, 75 . . . electric to hydraulic signal conversion device, 76 . . . pilot pressure signal shutoff valve, 77 . . . hydraulic alone swing mode fixation switch, 80 . . . controller (swing mode changeover unit), 81 . . . abnormality monitoring/abnormality processing control block, 82 . . . energy management control block, 83 . . . hydraulic and electric complex swing control block, 84 . . . hydraulic alone control block

The invention claimed is:

1. A construction machine having a swing structure, comprising:
    an engine;
    a hydraulic pump which is driven by the engine;
    the swing structure;
    a swing electric motor and a hydraulic motor which drive the swing structure;
    a swing operation lever which is operated by an operator to drive the swing structure;
    an assist electric motor which assist-drives the hydraulic pump during motoring and generates electric energy during drive using the engine;
    an electric storage device which stores electric energy to be supplied to the swing electric motor and the assist electric motor; and
    a controller which receives a signal corresponding to an operation amount and an operation direction on the swing operation lever and controls charge and discharge in the electric storage device, the controller configured to include a hydraulic and electric complex swing mode for driving the swing structure with total torque obtained by summing up torques of the swing electric motor and the hydraulic motor and a hydraulic alone mode for driving the swing structure with torque of only the hydraulic motor, and control charge and discharge in the electric storage device by changing over a mode between the hydraulic and electric complex swing mode and the hydraulic alone mode in a state where the hydraulic motor is driven, wherein,
    the controller stores, for an amount of electricity stored in the electric storage device, an upper limit value and a lower limit value of a normal use region which is an optimal use range of the electric storage device, a regeneration prohibition value which is set to be larger than the upper limit value of the normal use region and to be smaller than a maximum amount of electricity stored in the electric storage device, and a swing prohibition value which is set to be smaller than the lower limit value of the normal use region and to be larger than a minimum amount of electricity stored in the electric storage device; and when the amount of electricity stored in the electric storage device is in between the upper limit value and the lower limit value of the normal use range, the controller drives and brakes the swing structure in the hydraulic and electric complex swing mode;

when the amount of electricity stored in the electric storage device exceeds the upper limit value of the normal use range and reaches the regeneration prohibition value, the controller drives and brakes the swing structure in the hydraulic alone mode while motoring the assist electric motor so as to consume the electric energy stored in the electric storage device;

conversely when the amount of electricity stored in the electric storage device falls below the lower limit value of the normal use range and reaches the swing prohibition value, the controller drives and brakes the swing structure in the hydraulic alone mode while using the engine to drive the assist electric motor so as to charge the electric storage device;

while the amount of electricity stored in the electric storage device reaches from the upper limit value to the regeneration prohibition value, the controller motors the assist electric motor at a maximum output; and while the amount of electricity stored in the electric storage device reaches from the lower limit value to the swing prohibition value, the controller controls the assist electric motor to perform motor generating operation at a maximum output.

2. A construction machine having a swing structure according to claim 1, wherein, when the amount of electricity stored in the electric storage device exceeds the upper limit value of the normal use range and reaches the regeneration prohibition value, the controller continues to drive and brake the swing structure using only the hydraulic motor till the amount of electricity stored in the electric storage device reaches a predetermined intermediate value set between the upper limit value and the lower limit value of the normal use range, and as soon as the amount of electricity stored in the electric storage device reaches the intermediate value, the controller changes over to drive and brake the swing structure using both the swing electric motor and the hydraulic motor.

3. A construction machine having a swing structure according to claim 1, wherein, when the amount of electricity stored in the electric storage device falls below the lower limit value of the normal use range and reaches the swing prohibition value, the controller continues to drive and brake the swing structure using only the hydraulic motor till the amount of electricity stored in the electric storage device reaches a predetermined intermediate value set between the upper limit value and the lower limit value of the normal use range, and as soon as the amount of electricity stored in the electric storage device reaches the intermediate value, the controller changes over to drive and brake the swing structure using both the swing electric motor and the hydraulic motor.

4. A construction machine having a swing structure according to claim 1, wherein, when the amount of electricity stored in the electric storage device is within the normal use range and the controller is driving the swing structure in accordance with the operation amount and the operation direction on the swing operation lever using both the swing electric motor and the hydraulic motor, the controller computes a driving torque instruction value for the swing electric motor in accordance with the amount of electricity stored in the electric storage device and the swing electric motor is driven based on the computed driving torque instruction value.

5. A construction machine having a swing structure according to claim 1, wherein, when the amount of electricity stored in the electric storage device is within the normal use range and the controller is braking the swing structure in accordance with the operation amount and the operation direction on the swing operation lever using both the swing electric motor and the hydraulic motor, the controller computes a driving torque instruction value for the swing electric motor in accordance with the amount of electricity stored in the electric storage device and the swing electric motor is driven based on the computed driving torque instruction value so as to brake the swing structure.

6. A construction machine having a swing structure according to claim 4 wherein, the driving torque instruction value for the swing electric motor computed in accordance with the amount of electricity stored in the electric storage device varies in accordance with the amount of the stored electricity on same driving or braking conditions, the variation of the torque is not higher than 20% relative to a standard value of total torque obtained by summing up torque of the electric motor and torque of the hydraulic motor on the same driving or braking conditions.

* * * * *